US008808080B2

(12) United States Patent
Meyer

(10) Patent No.: US 8,808,080 B2
(45) **Date of Patent: *Aug. 19, 2014**

(54) GRID-BASED LOTTERY GAME AND ASSOCIATED METHOD

(75) Inventor: Mark G. Meyer, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,099

(22) Filed: May 11, 2011

(65) Prior Publication Data

US 2011/0281637 A1 Nov. 17, 2011

Related U.S. Application Data

(60) Provisional application No. 61/334,814, filed on May 14, 2010.

(51) Int. Cl.
*G06F 17/00* (2006.01)
*G07F 17/32* (2006.01)
*G07C 15/00* (2006.01)

(52) U.S. Cl.
CPC .......... *G07F 17/329* (2013.01); *G07F 17/3244* (2013.01); *G07C 15/005* (2013.01)
USPC ............................................................ 463/17

(58) Field of Classification Search
CPC .. G07F 17/329; G07F 17/3244; G07C 15/005
USPC ............................................................ 463/17
See application file for complete search history.

(56) References Cited

U.S. PATENT DOCUMENTS

| | | | |
|---|---|---|---|
| 1,527,929 | A | 2/1925 | Simons |
| 3,089,123 | A | 5/1963 | Hennis et al. |
| 3,245,697 | A | 4/1966 | Nugent |
| 3,699,311 | A | 10/1972 | Dunbar |

(Continued)

FOREIGN PATENT DOCUMENTS

| | | |
|---|---|---|
| AU | B-18428/92 | 12/1992 |
| AU | B-21070/92 | 7/1993 |

(Continued)

OTHER PUBLICATIONS

'Are You in?', (Article).

(Continued)

*Primary Examiner* — Lawrence Galka
(74) *Attorney, Agent, or Firm* — Dority & Manning, P.A.

(57) ABSTRACT

A game method and related system provide a plurality of lottery tickets for players in the lottery game, with each lottery ticket having a grid of uniquely identifiable positions displayed thereon. The grid on each ticket is randomly populated with indicia from a field of indicia such that the grid positions contain at least one indicia and the entire field of indicia is randomly populated into each grid. A set of player indicia is indicted on each lottery ticket, which may be randomly generated or selected by the player. The positions in the grid are randomly and sequentially drawn, and the sequential order in which the positions were drawn is provided to the players. Prizes are determined for winning lottery tickets as a function of the number of the grid positions sequentially and randomly drawn prior to matching all of the player indicia on the respective lottery tickets.

20 Claims, 6 Drawing Sheets

(56) References Cited

U.S. PATENT DOCUMENTS

| | | | |
|---|---|---|---|
| 3,736,368 | A | 5/1973 | Vogelman et al. |
| 3,826,499 | A | 7/1974 | Lenkoff |
| 3,868,057 | A | 2/1975 | Chavez |
| 3,876,865 | A | 4/1975 | Bliss |
| 3,902,253 | A | 9/1975 | Sabuzawa et al. |
| 3,918,174 | A | 11/1975 | Miller et al. |
| 3,922,529 | A | 11/1975 | Orloff |
| 3,934,120 | A | 1/1976 | Maymarev |
| 4,017,834 | A | 4/1977 | Cuttill et al. |
| 4,095,824 | A | 6/1978 | Bachman |
| 4,105,156 | A | 8/1978 | Dethloff |
| 4,176,406 | A | 11/1979 | Matkan |
| 4,191,376 | A | 3/1980 | Goldman et al. |
| 4,194,296 | A | 3/1980 | Pagnozzi et al. |
| 4,195,772 | A | 4/1980 | Nishimura |
| 4,206,920 | A | 6/1980 | Weatherford et al. |
| 4,241,942 | A | 12/1980 | Bachman |
| 4,243,216 | A | 1/1981 | Mazumder |
| 4,273,362 | A | 6/1981 | Carrier et al. |
| 4,309,452 | A | 1/1982 | Sachs |
| 4,313,087 | A | 1/1982 | Weitzen et al. |
| 4,355,300 | A | 10/1982 | Weber |
| 4,375,666 | A | 3/1983 | Buck et al. |
| 4,398,708 | A | 8/1983 | Goldman et al. |
| 4,407,443 | A | 10/1983 | McCorkle |
| 4,451,759 | A | 5/1984 | Heynisch |
| 4,455,039 | A | 6/1984 | Weitzen et al. |
| 4,457,430 | A | 7/1984 | Darling et al. |
| 4,464,423 | A | 8/1984 | LaBianca et al. |
| 4,466,614 | A | 8/1984 | Bachman et al. |
| 4,488,646 | A | 12/1984 | McCorkle |
| 4,491,319 | A | 1/1985 | Nelson |
| 4,494,197 | A | 1/1985 | Troy et al. |
| 4,536,218 | A | 8/1985 | Ganho |
| 4,544,184 | A | 10/1985 | Freund et al. |
| 4,579,371 | A | 4/1986 | Long et al. |
| 4,591,189 | A | 5/1986 | Holmen et al. |
| 4,634,149 | A | 1/1987 | Donovan |
| 4,665,502 | A | 5/1987 | Kreisner |
| 4,669,729 | A | 6/1987 | Solitt et al. |
| 4,689,742 | A | 8/1987 | Troy et al. |
| 4,726,608 | A | 2/1988 | Walton |
| 4,736,109 | A | 4/1988 | Dvorzsak |
| 4,738,473 | A | 4/1988 | Meloni et al. |
| 4,740,016 | A | 4/1988 | Konecny et al. |
| 4,760,247 | A | 7/1988 | Keane et al. |
| 4,763,927 | A | 8/1988 | Schneider |
| 4,775,155 | A | 10/1988 | Lees |
| 4,792,667 | A | 12/1988 | Chen |
| 4,805,907 | A | 2/1989 | Hagiwara |
| 4,817,951 | A | 4/1989 | Crouch et al. |
| 4,835,624 | A | 5/1989 | Black et al. |
| 4,836,546 | A | 6/1989 | DiRe et al. |
| 4,836,553 | A | 6/1989 | Suttle et al. |
| 4,837,728 | A | 6/1989 | Barrie et al. |
| 4,856,787 | A | 8/1989 | Itkis |
| 4,861,041 | A | 8/1989 | Jones et al. |
| 4,870,260 | A | 9/1989 | Niepolomski et al. |
| 4,880,964 | A | 11/1989 | Donahue |
| 4,888,964 | A | 12/1989 | Klinge |
| 4,922,522 | A | 5/1990 | Scanlon |
| 4,943,090 | A | 7/1990 | Fienberg |
| 4,960,611 | A | 10/1990 | Fujisawa et al. |
| 4,961,578 | A | 10/1990 | Chateau |
| 4,964,642 | A | 10/1990 | Kamille |
| 4,996,705 | A | 2/1991 | Entenmann et al. |
| 4,998,010 | A | 3/1991 | Chandler et al. |
| 4,998,199 | A | 3/1991 | Tashiro et al. |
| 5,032,708 | A | 7/1991 | Comerford et al. |
| 5,037,099 | A | 8/1991 | Burtch |
| 5,046,737 | A | 9/1991 | Fienberg |
| 5,074,566 | A | 12/1991 | Desbiens |
| 5,083,815 | A | 1/1992 | Scrymgeour et al. |
| 5,092,598 | A | 3/1992 | Kamille |
| 5,094,458 | A | 3/1992 | Kamille |
| 5,100,139 | A | 3/1992 | Di Bella |
| 5,109,153 | A | 4/1992 | Johnsen et al. |
| 5,112,050 | A | 5/1992 | Koza et al. |
| 5,116,049 | A | 5/1992 | Sludikoff et al. |
| 5,118,109 | A | 6/1992 | Gumina |
| 5,119,295 | A | 6/1992 | Kapur |
| 5,158,293 | A | 10/1992 | Mullins |
| 5,165,967 | A | 11/1992 | Theno et al. |
| 5,186,463 | A | 2/1993 | Marin et al. |
| 5,189,292 | A | 2/1993 | Batterman et al. |
| 5,193,815 | A | 3/1993 | Pollard |
| 5,193,854 | A | 3/1993 | Borowski, Jr. et al. |
| 5,228,692 | A | 7/1993 | Carrick et al. |
| 5,232,221 | A | 8/1993 | Sludikoff et al. |
| 5,234,798 | A | 8/1993 | Heninger et al. |
| 5,249,801 | A | 10/1993 | Jarvis |
| 5,259,616 | A | 11/1993 | Bergmann |
| 5,273,281 | A | 12/1993 | Lovell |
| 5,276,980 | A | 1/1994 | Carter et al. |
| 5,282,620 | A | 2/1994 | Keesee |
| 5,308,992 | A | 5/1994 | Crane et al. |
| 5,317,135 | A | 5/1994 | Finocchio |
| 5,326,104 | A | 7/1994 | Pease et al. |
| 5,332,219 | A | 7/1994 | Marnell, II et al. |
| 5,342,047 | A | 8/1994 | Heidel et al. |
| 5,342,049 | A | 8/1994 | Wichinsky et al. |
| 5,344,144 | A | 9/1994 | Canon |
| 5,346,258 | A | 9/1994 | Behn et al. |
| 5,380,007 | A | 1/1995 | Travis et al. |
| 5,393,057 | A | 2/1995 | Marnell, II et al. |
| 5,401,024 | A | 3/1995 | Simunek |
| 5,403,039 | A | 4/1995 | Borowski, Jr. et al. |
| 5,407,199 | A | 4/1995 | Gumina |
| 5,411,260 | A | 5/1995 | Smith |
| 5,420,406 | A | 5/1995 | Izawa et al. |
| 5,432,005 | A | 7/1995 | Tanigami et al. |
| 5,451,052 | A | 9/1995 | Behm et al. |
| 5,453,602 | A | 9/1995 | Hanada |
| 5,456,465 | A | 10/1995 | Durham |
| 5,471,040 | A | 11/1995 | May |
| 5,475,205 | A | 12/1995 | Behm et al. |
| 5,486,005 | A | 1/1996 | Neal |
| 5,513,846 | A | 5/1996 | Niederlein et al. |
| 5,528,154 | A | 6/1996 | Leichner et al. |
| 5,536,016 | A | 7/1996 | Thompson |
| 5,540,442 | A | 7/1996 | Orselli et al. |
| 5,548,110 | A | 8/1996 | Storch et al. |
| 5,550,746 | A | 8/1996 | Jacobs |
| 5,560,610 | A | 10/1996 | Behm et al. |
| 5,564,700 | A | 10/1996 | Celona |
| 5,564,977 | A | 10/1996 | Algie |
| 5,591,956 | A | 1/1997 | Longacre, Jr. et al. |
| 5,599,046 | A | 2/1997 | Behm et al. |
| 5,602,381 | A | 2/1997 | Hoshino et al. |
| 5,621,200 | A | 4/1997 | Irwin et al. |
| 5,628,684 | A | 5/1997 | Bouedec |
| 5,630,753 | A | 5/1997 | Fuchs |
| 5,651,735 | A | 7/1997 | Baba |
| 5,655,961 | A | 8/1997 | Acres et al. |
| 5,667,250 | A | 9/1997 | Behm et al. |
| 5,682,819 | A | 11/1997 | Beaty |
| 5,690,366 | A | 11/1997 | Luciano |
| 5,704,647 | A | 1/1998 | Desbiens |
| 5,722,891 | A | 3/1998 | Inoue |
| 5,726,898 | A | 3/1998 | Jacobs |
| 5,732,948 | A | 3/1998 | Yoseloff |
| 5,741,183 | A | 4/1998 | Acres et al. |
| 5,743,800 | A | 4/1998 | Huard et al. |
| 5,752,882 | A | 5/1998 | Acres et al. |
| 5,756,220 | A | 5/1998 | Hoshino et al. |
| 5,768,142 | A | 6/1998 | Jacobs |
| 5,769,458 | A | 6/1998 | Carides et al. |
| 5,770,533 | A | 6/1998 | Franchi |
| 5,772,509 | A | 6/1998 | Weiss |
| 5,772,510 | A | 6/1998 | Roberts |
| 5,772,511 | A | 6/1998 | Smeltzer |
| RE35,864 | E | 7/1998 | Weingardt |
| 5,779,840 | A | 7/1998 | Boris |
| 5,789,459 | A | 8/1998 | Inagaki et al. |

(56) References Cited

U.S. PATENT DOCUMENTS

| | | | |
|---|---|---|---|
| 5,791,990 A | 8/1998 | Schroeder et al. | |
| 5,797,794 A | 8/1998 | Angell | |
| 5,803,504 A | 9/1998 | Deshiens et al. | |
| 5,816,920 A | 10/1998 | Hanai | |
| 5,818,019 A | 10/1998 | Irwin, Jr. et al. | |
| 5,820,459 A | 10/1998 | Acres et al. | |
| 5,823,874 A | 10/1998 | Adams | |
| 5,830,063 A | 11/1998 | Byrne | |
| 5,830,066 A | 11/1998 | Goden et al. | |
| 5,830,067 A | 11/1998 | Graves et al. | |
| 5,833,537 A | 11/1998 | Barrie | |
| 5,835,576 A | 11/1998 | Katz et al. | |
| 5,836,086 A | 11/1998 | Elder | |
| 5,836,817 A | 11/1998 | Acres et al. | |
| 5,848,932 A | 12/1998 | Adams | |
| 5,863,075 A | 1/1999 | Rich et al. | |
| 5,871,398 A | 2/1999 | Schneier et al. | |
| 5,876,284 A | 3/1999 | Acres et al. | |
| 5,882,261 A | 3/1999 | Adams | |
| 5,883,537 A | 3/1999 | Luoni et al. | |
| 5,885,158 A | 3/1999 | Torango et al. | |
| 5,887,906 A | 3/1999 | Sultan | |
| 5,903,340 A | 5/1999 | Lawandy et al. | |
| 5,911,418 A | 6/1999 | Adams | |
| 5,915,588 A | 6/1999 | Stoken et al. | |
| 5,934,671 A | 8/1999 | Harrison | |
| 5,935,002 A | 8/1999 | Falciglia | |
| 5,970,143 A | 10/1999 | Schneier et al. | |
| 5,979,894 A | 11/1999 | Alexoff | |
| 5,996,997 A | 12/1999 | Kamille | |
| 5,997,044 A | 12/1999 | Behm et al. | |
| 6,003,307 A | 12/1999 | Naber et al. | |
| 6,004,207 A | 12/1999 | Wilson, Jr. et al. | |
| 6,007,162 A | 12/1999 | Hinz et al. | |
| 6,012,982 A | 1/2000 | Piechowiak et al. | |
| 6,014,032 A | 1/2000 | Maddix et al. | |
| 6,017,032 A | 1/2000 | Grippo et al. | |
| 6,024,641 A | 2/2000 | Sarno | |
| 6,053,405 A | 4/2000 | Irwin, Jr. et al. | |
| 6,077,162 A | 6/2000 | Weiss | |
| 6,080,062 A | 6/2000 | Olson | |
| 6,086,477 A | 7/2000 | Walker et al. | |
| 6,089,978 A | 7/2000 | Adams | |
| 6,099,407 A | 8/2000 | Parker, Jr. et al. | |
| 6,102,400 A | 8/2000 | Scott et al. | |
| 6,107,913 A | 8/2000 | Gatto et al. | |
| 6,119,364 A | 9/2000 | Elder | |
| 6,125,368 A | 9/2000 | Bridge et al. | |
| 6,142,872 A | 11/2000 | Walker et al. | |
| 6,146,272 A | 11/2000 | Walker et al. | |
| 6,149,521 A | 11/2000 | Sanduski | |
| 6,155,491 A | 12/2000 | Dueker et al. | |
| 6,168,521 B1 | 1/2001 | Luciano et al. | |
| 6,168,522 B1 | 1/2001 | Walker et al. | |
| 6,176,487 B1 | 1/2001 | Eklund et al. | |
| 6,179,710 B1 | 1/2001 | Sawyer et al. | |
| 6,203,430 B1 | 3/2001 | Walker et al. | |
| 6,206,373 B1 | 3/2001 | Garrod | |
| 6,210,275 B1 | 4/2001 | Olsen | |
| 6,217,448 B1 | 4/2001 | Olsen | |
| 6,220,596 B1 | 4/2001 | Horan | |
| 6,220,961 B1 | 4/2001 | Keane et al. | |
| 6,224,055 B1 | 5/2001 | Walker et al. | |
| 6,227,969 B1 | 5/2001 | Yoseloff | |
| 6,238,288 B1 | 5/2001 | Walker et al. | |
| 6,241,246 B1 * | 6/2001 | Guttin et al. | 273/139 |
| 6,309,300 B1 | 10/2001 | Glavich | |
| 6,312,334 B1 | 11/2001 | Yoseloff | |
| 6,315,291 B1 | 11/2001 | Moody | |
| 6,330,976 B1 | 12/2001 | Dymetman et al. | |
| 6,331,143 B1 | 12/2001 | Yoseloff | |
| 6,334,814 B1 | 1/2002 | Adams | |
| 6,340,158 B2 | 1/2002 | Pierce et al. | |
| 6,368,213 B1 | 4/2002 | McNabola | |
| 6,375,568 B1 | 4/2002 | Roffman et al. | |
| 6,379,742 B1 | 4/2002 | Behm et al. | |
| 6,394,899 B1 | 5/2002 | Walker et al. | |
| 6,398,214 B1 | 6/2002 | Moteki et al. | |
| 6,398,643 B1 | 6/2002 | Knowles et al. | |
| 6,398,644 B1 | 6/2002 | Perrie et al. | |
| 6,398,645 B1 | 6/2002 | Yoseloff | |
| 6,416,408 B2 | 7/2002 | Tracy et al. | |
| 6,419,579 B1 | 7/2002 | Bennett | |
| 6,435,408 B1 | 8/2002 | Irwin, Jr. et al. | |
| 6,435,500 B2 | 8/2002 | Gumina | |
| 6,478,677 B1 | 11/2002 | Moody | |
| 6,491,215 B1 | 12/2002 | Irwin, Jr. et al. | |
| 6,497,408 B1 | 12/2002 | Walker et al. | |
| 6,514,144 B2 | 2/2003 | Riendeau et al. | |
| 6,552,290 B1 | 4/2003 | Lawandy | |
| 6,588,747 B1 | 7/2003 | Seelig | |
| 6,599,186 B1 | 7/2003 | Walker et al. | |
| 6,601,772 B1 | 8/2003 | Rubin et al. | |
| 6,637,747 B1 | 10/2003 | Garrod | |
| 6,645,071 B2 | 11/2003 | Perrie et al. | |
| 6,648,735 B2 | 11/2003 | Miyashita et al. | |
| 6,648,753 B1 | 11/2003 | Tracy et al. | |
| 6,648,755 B1 | 11/2003 | Luciano et al. | |
| 6,676,126 B1 | 1/2004 | Walker et al. | |
| 6,692,354 B2 | 2/2004 | Tracy et al. | |
| 6,702,047 B2 | 3/2004 | Huber | |
| 6,773,345 B2 | 8/2004 | Walker et al. | |
| 6,776,337 B2 | 8/2004 | Irwin, Jr. et al. | |
| 6,786,824 B2 | 9/2004 | Cannon | |
| 6,823,874 B2 | 11/2004 | Lexcen | |
| 6,855,055 B2 | 2/2005 | Perrie et al. | |
| 6,875,105 B1 | 4/2005 | Behm et al. | |
| 6,929,186 B2 | 8/2005 | Lapstun | |
| 6,955,353 B2 | 10/2005 | Taylor et al. | |
| 6,988,948 B2 | 1/2006 | Perrie et al. | |
| 7,699,314 B2 | 4/2010 | Bozeman | |
| 8,056,900 B2 | 11/2011 | Bozeman | |
| 2001/0027130 A1 | 10/2001 | Namba et al. | |
| 2001/0030978 A1 | 10/2001 | Holloway et al. | |
| 2001/0034262 A1 | 10/2001 | Banyai | |
| 2001/0040345 A1 | 11/2001 | Au-Yeung | |
| 2002/0022511 A1 | 2/2002 | Eklund et al. | |
| 2002/0082071 A1 | 6/2002 | Riendeau et al. | |
| 2002/0084335 A1 | 7/2002 | Ericson | |
| 2002/0125637 A1 * | 9/2002 | Leis | 273/272 |
| 2002/0171201 A1 | 11/2002 | Au-Yeung | |
| 2002/0187825 A1 | 12/2002 | Tracy et al. | |
| 2003/0050109 A1 * | 3/2003 | Caro et al. | 463/17 |
| 2003/0064773 A1 * | 4/2003 | Baerlocher et al. | 463/16 |
| 2003/0114210 A1 | 6/2003 | Meyer et al. | |
| 2004/0036212 A1 | 2/2004 | Walker et al. | |
| 2004/0076310 A1 | 4/2004 | Hersch et al. | |
| 2004/0173965 A1 | 9/2004 | Stanek | |
| 2004/0178579 A1 | 9/2004 | Lowell et al. | |
| 2004/0178582 A1 | 9/2004 | Garrod | |
| 2004/0185931 A1 | 9/2004 | Hartman et al. | |
| 2004/0201169 A1 * | 10/2004 | Schaefer et al. | 273/139 |
| 2004/0204222 A1 | 10/2004 | Roberts | |
| 2004/0229674 A1 | 11/2004 | Thomas | |
| 2004/0259631 A1 | 12/2004 | Katz et al. | |
| 2004/0266514 A1 | 12/2004 | Penrice | |
| 2005/0085289 A1 * | 4/2005 | Bozeman | 463/17 |
| 2005/0227752 A1 * | 10/2005 | Weiss | 463/17 |
| 2006/0151943 A1 | 7/2006 | Bozeman | |
| 2006/0258433 A1 * | 11/2006 | Finocchio et al. | 463/16 |
| 2007/0003144 A1 * | 1/2007 | Landstad | 382/189 |
| 2007/0173311 A1 * | 7/2007 | Morrow et al. | 463/16 |
| 2010/0167806 A1 | 7/2010 | Martineck, Sr. | |
| 2010/0273548 A1 | 10/2010 | Bozeman | |
| 2012/0244927 A1 * | 9/2012 | Weatherby et al. | 463/19 |

FOREIGN PATENT DOCUMENTS

| | | |
|---|---|---|
| AU | A-50327/96 | 2/1997 |
| AU | B-52499/96 | 2/1997 |
| AU | 199716432 | 9/1997 |
| AU | A-45403/97 | 4/1998 |
| AU | A-63553/98 | 10/1998 |
| DE | 2938307 | 4/1981 |

(56) References Cited

FOREIGN PATENT DOCUMENTS

| | | | |
|---|---|---|---|
| DE | 3035898 | | 4/1982 |
| DE | 13035947 | | 5/1982 |
| DE | 2938307 | | 6/1982 |
| DE | 29803107 | | 8/1988 |
| DE | 13822636 | | 1/1990 |
| DE | 2938307 | C3 | 8/1990 |
| DE | 3415114 | | 10/1995 |
| DE | 19646956 | | 5/1998 |
| DE | 19706286 | | 5/1998 |
| DE | 29816453 | | 4/1999 |
| DE | 19751746 | | 5/1999 |
| EP | 0122902 | B1 | 4/1984 |
| EP | 0333934 | A1 | 9/1989 |
| EP | 0458623 | B1 | 11/1991 |
| EP | 0798676 | | 10/1997 |
| EP | 0799649 | A1 | 10/1997 |
| EP | 0799649 | B1 | 12/1997 |
| EP | 0149712 | A2 | 7/1998 |
| EP | 0874337 | | 10/1998 |
| EP | 0896304 | | 2/1999 |
| EP | 0914875 | | 5/1999 |
| EP | 0919965 | | 6/1999 |
| EP | 0983801 | A2 | 3/2000 |
| EP | 0983801 | A3 | 3/2001 |
| EP | 1149712 | | 10/2001 |
| ES | 2006400 | | 4/1989 |
| ES | 2006401 | | 4/1989 |
| GB | 642892 | | 9/1950 |
| GB | 1495121 | | 12/1977 |
| GB | 2075918 | | 11/1981 |
| GB | 2222712 | | 3/1990 |
| GB | 2230373 | | 10/1990 |
| GB | 2295775 | | 12/1996 |
| GB | 2328311 | | 2/1999 |
| GB | 2 383 544 | | 7/2003 |
| JP | 02235744 | | 9/1990 |
| JP | 04132672 | | 5/1992 |
| WO | WO85/02250 | | 5/1985 |
| WO | WO91/17529 | | 11/1991 |
| WO | WO 98/03910 | | 1/1998 |
| WO | WO 98/40138 | | 9/1998 |
| WO | WO 99/09364 | | 2/1999 |
| WO | WO 99/26204 | | 5/1999 |
| WO | WO 99/39312 | | 8/1999 |
| WO | WO00/00256 | | 1/2000 |
| WO | WO00/78418 | | 12/2000 |
| WO | WO01/74460 | | 11/2001 |
| WO | WO01/93966 | | 12/2001 |
| WO | WO02/056266 | | 7/2002 |
| WO | WO 02087713 | | 11/2002 |

OTHER PUBLICATIONS

'Beginner's Guide—How to Bet', (www.plimico.com/How+to+wager/beginnersguide/), (Internet Article), 3 Pgs.

Chip Brown, 'Austin American-Statesman', (Article), May 28, 1998, 2 Pgs., Texas.

John C. Hallyburton, Jr., 'Frequently Asked Questions About Keno', (Internet Article), 1995, 1998, 10 Pgs., (http://conielco.com/faq/keno.html).

'Horse betting Tutorial—Types of Bets' (www.homepokergames.com/horsebettingtutorial.php), (Internet Article), 2 Pgs.

Judith Gaines, 'Pool Party Betting Business Booming Throughout Area Workplaces', (Internet Article), Mar. 19, 1994, 2 Pgs., Issue 07431791, Boston Globe, Boston, MA.

'Maryland Launches Let It Ride', (Internet Article), Circa 2001,1 Pg.

'Notice of Final Rulemaking', (Internet Article) Mar. 24, 2000, 10 Pgs., vol. 6, Issue #13, Arizona Administrative Register, Arizona.

'How to Play Megabucks', (Internet Article), Mar. 9, 2001, 2 Pgs., Oregon Lottery Megabucks,(http://www.oregonlottery.org/mega/m.sub.--howto.htm).

'How to Play Megabucks', (Internet Article), May 8, 2001, 2 Pgs., Oregon Lottery Megabucks, (http://www.oregonlottery.org/mega/m.sub.--howto.htm).

'Oregon Lottery', (Internet Article), Apr. 30, 2004, 9 Pgs., Oregon Lottery Web Center, (http://www.oregonlottery.org/general/g.sub.--hist.shtml).

'Powerball Odd & Prizes', 'How to Play Powerball', (Internet Article),Dec. 2002, 2 Pgs., (www.powerball.com/pbhowtoplay.shtm).

'Powerball Prizes and Odds', (Internet Article), 2 Pgs., http://www.powerball.com/pbprizesNOdds.shtm.

'Learn to Play the Races' (Internet Article), 15 Pgs., Racing Daily Form (www.drf.com).

Mike Parker, 'The History of Horse Racing' (Internet Article),1996,1997,1998, 5 Pgs., http://www.mrmike.com/explore/hrhist.htm.

* cited by examiner

10

32

Prize Table

| Balls Drawn | 7 Missing Letters | |
|---|---|---|
| | Odds | Prize |
| 7 | 657,800.0 | $7,500.00 |
| 8 | 93,971.4 | $2,500.00 |
| 9 | 23,429.9 | $599.00 |
| 10 | 7,831.0 | $500.00 |
| 11 | 3,132.4 | $250.00 |
| 12 | 1,423.8 | $125.00 |
| 13 | 711.9 | $25.00 |
| 14 | 383.3 | $12.50 |
| 15 | 219.0 | $7.50 |
| 16 | 131.4 | $5.00 |
| 17 | 82.1 | $4.00 |
| 18 | 53.2 | $2.00 |
| 19 | 35.4 | $1.50 |
| 20 | 24.2 | $1.00 |

Fig.3

34

| Drawing Results 04/07/2010 | | | |
|---|---|---|---|
| 1st: | 4 | 14th: | 19 |
| 2nd: | 1 | 15th: | 21 |
| 3rd: | 7 | 16th: | 24 |
| 4th: | 23 | 17th: | 3 |
| 5th: | 5 | 18th: | 25 |
| 6th: | 6 | 19th: | 22 |
| 7th: | 18 | 20th: | 20 |
| 8th: | 26 | 21st: | 17 |
| 9th: | 9 | 22nd: | 14 |
| 10th: | 15 | 23rd: | 12 |
| 11th: | 11 | 24th: | 10 |
| 12th: | 13 | 25th: | 8 |
| 13th: | 16 | 26th: | 2 |

Fig. 4

34

| Drawing Results 04/07/2010 | | | |
|---|---|---|---|
| 1st: | 4 | 14th: | 19 |
| 2nd: | 1 | 15th: | 21 |
| 3rd: | 7 | 16th: | 24 |
| 4th: | 23 | 17th: | ***Wild Ball*** |
| 5th: | 5 | 18th: | 25 |
| 6th: | ***Wild Ball*** | 19th: | 22 |
| 7th: | 18 | 20th: | 20 |
| 8th: | 26 | 21st: | 17 |
| 9th: | 9 | 22nd: | 14 |
| 10th: | 15 | 23rd: | 12 |
| 11th: | 11 | 24th: | 10 |
| 12th: | 13 | 25th: | 8 |
| 13th: | 16 | 26th: | 2 |

Fig. 5

GRID-BASED LOTTERY GAME AND ASSOCIATED METHOD

PRIORITY CLAIM

The present application claims priority to U.S. Provisional Application Ser. No. 61/334,814, filed May 14, 2010.

FIELD OF THE INVENTION

The present invention relates generally to a lottery game system and method, and more particularly to grid-based game wherein a grid of randomly populated indicia determines a winning event as a function of the order in which the grid positions are subsequently drawn.

BACKGROUND

Draw-type lottery games are well known wherein players select (or are randomly assigned) a set of player indicia from a field of indicia. For example, POWERBALL is a popular multi-state game wherein players select five numbers from the field of numbers 1 through 59 ("5/59" draw), and one number from a field of numbers 1 through 39 ("1/39" draw). At a subsequent drawing, five numbers are randomly generated from the field of fifty-nine numbers, and one number is randomly generated from the field of thirty-nine numbers. A win is determined for the player by matching one of nine possible match combinations. Various "pick-3", "pick-4", and other types of draw games are also well known.

With typical draw-type games, a defined subset of indicia is randomly generated by the lottery from the field of indicia, and a win is determined by players simply comparing their selected player indicia to the randomly drawn lottery indicia. Prizes are typically determined as a function of the number of matches. In certain games, the order of the matches may also be considered in the prize determination. A disadvantage of these conventional draw-type games is that the randomly generated set of lottery indicia has the same value to all players and is thus limited in its versatility and ability to generate additional excitement and interest in the game. For example, with the conventional POWERBALL game, the 5/59 draw generates the same 5 numbers for all players. Once the draw is conducted, all that remains is to compare the player's numbers to the drawn numbers to determine whether or not a particular ticket is a winner. The lottery industry would benefit from a method and related system that increases the versatility and utility of the draw event beyond that of simply generating the same set of indicia for all players. The present invention provides just such a method and related system.

SUMMARY

Objects and advantages of the invention will be set forth in the following description, or may be obvious from the description, or may be learned through practice of the invention. It is intended that the invention include modifications and variations to the system and method embodiments described herein.

The present invention provides a unique lottery game method and associated system wherein a plurality of different lottery tickets are provided for players in the lottery game. In a particular embodiment, the lottery tickets are printed at respective game terminals at the time of purchase of the lottery tickets. Each lottery ticket is provided with a grid of uniquely identifiable grid positions displayed thereon. For example, the grid positions may be identified by individual numbers, coordinates, and any other suitable identification means. The respective grids are randomly populated with indicia from a field of indicia such that grid positions contain at least one indicia and the entire field of indicia is randomly populated into each grid. For example, the field of indicia may be a range of numbers or the complete alphabet, and so forth, and each number or letter in the field is randomly populated into the grid. Because the field is randomly populated into the respective grids on an individual ticket basis, the populated grids vary between different lottery tickets. In other words, each ticket may contain a grid with all of the letters of the alphabet, but the location of the letters within the grid will vary from ticket to ticket.

The grids may have more grid positions than there are indicia in the field of indicia, or they may have only as many grid positions as there are indicia. For example, in the alphabet embodiment, the grid may have only twenty-six grid positions with each grid position containing a letter, or the grid may have more than twenty-six grid positions, with one or more of the positions being left blank or containing one or more of a plurality of possible bonus symbols (e.g., prize doublers, instant cash prizes, and the like).

A set of player indicia is also indicated on each lottery ticket and constitutes a subset of indicia from the complete field of indicia. This set of player indicia may be randomly generated for the player at the time they request their ticket. In an alternate embodiment, the player is allowed to pick their set of play indicia by, for example, submitting a "play slip" having their selection indicated thereon. Such a play slip may be a paper slip submitted to a lottery clerk or an electronic version that is submitted to the lottery authority for players making their selections interactively via the Internet or other communication network. In a particular embodiment, for example, the field of indicia may be the numbers from 1 to 50, with the player indicia being a subset of seven numbers randomly generated from the field of numbers 1 to 50, or selected by the player marking seven numbers on a play slip submitted to a lottery retailer at the time of purchase of the ticket. Similarly, the field of indicia may be the alphabet, with the player indicia being seven randomly generated letters, or letters selected by the player.

After the lottery tickets have been issued to the players with the unique and individually generated grids thereon, a drawing event is conducted wherein all of the grid positions are randomly and sequentially drawn. For example, in the embodiment wherein the field of indicia is the alphabet and the respective grids thus contain at least twenty-six positions that are individually identified in the grids, all twenty-six positions may be randomly and sequentially drawn, and the order in which the positions are drawn is presented to the players. The order may be published on a web site, printed in a newspaper, televised, and so forth.

Winning tickets and prizes are determined as a function of the number of the grid positions sequentially and randomly drawn that are needed to match all of the player indicia on the respective lottery tickets. In the alphabet example, the set of player indicia may be seven randomly generated letters. All letters are in the grid, and all of the grid positions may be sequentially drawn. In a best possible scenario, the seven letters in the set of player indicia will correspond to the first seven grid positions drawn, which will result in a maximum prize. The seven letters may be found in the first ten grid positions drawn, which may result in a lesser prize. The seven letters may be found in the first fifteen positions drawn, resulting in an even lesser prize (if any), and so forth.

For embodiments wherein the prize structure depends on matching all of the player indicia within a certain number of draws that is less than the entire field of indicia, the drawn event may stop at this number. In other words, in the alphabet embodiment described above, various prizes may be awarded for matches occurring within the first twenty draws of the grid positions. In this case, the draw event may cease after the first twenty draws (without drawing the remaining six grid positions containing a letter). It may, however, be desired to continue the draw event until all of the positions in the grid have been randomly drawn for increased entertainment value to the players, or for any other reason.

In a particularly unique embodiment, each lottery ticket may include a puzzle or other type of game or problem, wherein the solution to the puzzle represents the set of player indicia. For example, the field of indicia may be the alphabet, and the puzzle may be a word puzzle wherein letters are missing from a phrase and constitute the set of player indicia. The set of missing letters may be identified on the ticket, or the player may be left to solve the puzzle to identify their respective set of play indicia. In another embodiment, the ticket may be a number problem (e.g., a Sudoku puzzle) and the numbers that solve the problem are the set of player indicia. Again, the solution may be printed or otherwise provided on the ticket, or may be left for the player to solve.

It should be appreciated that the same puzzle or problem may be presented on a plurality of different tickets and be solved by the same set of player indicia. The game is still different (with different winning scenarios) for different lottery tickets because of the differences in the randomly populated grids between the respective tickets.

In another embodiment, at least one of the randomly generated grid positions is a "wild" (or "free") position that may be used by a player to select any position on their respective lottery ticket grid. For example, the player may need one particular letter, number, or other indicia to complete the match of all of their player indicia. If the wild position is drawn, the player may immediately apply such position to the location of the missing indicia in their grid.

The unique lottery game discussed above may be combined with a different type of lottery game on the same lottery ticket. For example, the lottery ticket may incorporate an instant-win component wherein all or a portion of the player indicia or grid (or both) are covered by a scratch-off layer. Upon removal of the scratch-off layer, some exposed relationship between the player indicia and the location of the indicia on the grid results in an instant win. In a particular embodiment, for example, certain grid positions may be highlighted or otherwise uniquely identified, and if one of the indicia in the set of player indicia is located in one of the highlighted positions, the player may win an instant prize.

The invention also encompasses a system that is uniquely configured to host the lottery game discussed above. Such a system may include, for example, a communication network that links a plurality of game terminals to a lottery server. The system includes a plurality of lottery tickets that may be printed by the terminals, with each of the lottery tickets having a grid of uniquely identifiable positions displayed thereon. The gaming terminals may include programming or instructions to randomly populate the grids on each ticket issued by the game terminals with indicia from a field of indicia such that the grid positions contain at least one indicia and the entire field of indicia is randomly populated into the respective grids. In this manner, the randomly populated grids vary between different lottery tickets. It should be understood that the randomized grids on the respective tickets may be algorithmically "predefined" and stored on a game server.

Upon purchase, these predefined tickets are distributed to players either randomly or in sequential order. In this sense, "predefined" does not mean that the outcome of the game for any respective ticket is predetermined (a win or loss is determined by the subsequent draw process), but only that the randomized grids are defined and stored before purchase.

The game terminals may be further configured to randomly generate and indicate a set of player indicia on each lottery ticket, with the set of player indicia comprising a randomly generated subset of the field of indicia. The game terminals transmit information relevant to each ticket issued to the server, which creates and stores a record for each ticket.

In a subsequent drawing event, all positions on the grids are randomly and sequentially drawn and presented to the players in the sequential order in which they were drawn. The server is configured to determine winning tickets from the stored records and corresponding prizes as a function of the number of the grid positions sequentially and randomly drawn prior to matching all of the player indicia on the respective lottery tickets.

The server and associated game terminals may be further configured to carry out any of the game features in any of the various embodiments disclosed or enabled herein, and all such configurations are within the scope and spirit of the present invention.

Additional aspects of particular embodiments of the invention will be discussed below with reference to the appended figures.

BRIEF DESCRIPTION OF THE DRAWINGS

FIG. 3 is a back planar view of an embodiment of a game ticket illustrating a prize and odds table for the particular game offered with the ticket.

FIGS. 4 and 5 are exemplary embodiments of tables that may be used to publish to players the order in which the grid positions are randomly and sequentially draw.

DETAILED DESCRIPTION

Figure 1:
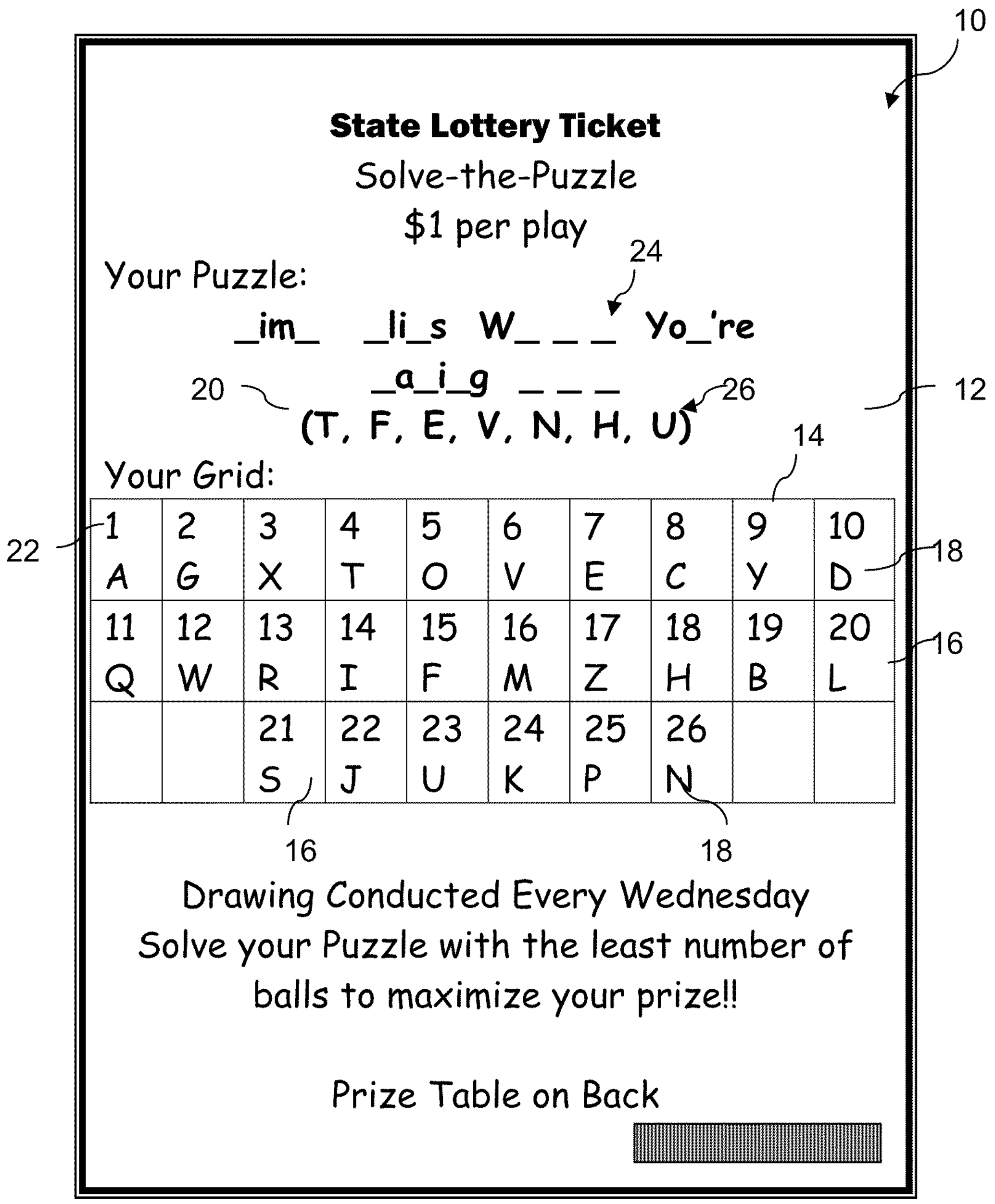
FIG. 1 is a front planar view of an embodiment of a game ticket in accordance with aspects of the invention.

Reference will now be made in detail to certain embodiments of the system and methodology in accordance with aspects of the invention, examples of which are illustrated in the drawings. Each embodiment is provided by way of explanation of the invention, and is not meant as a limitation of the invention. For example, features illustrated and described as part of one embodiment may be used with another embodiment to yield still a further embodiment. It is intended that the present invention include these and other modifications and variations as come within the scope of the appended claims and their equivalents.

FIG. 1 illustrates an exemplary embodiment of a lottery ticket 10 that incorporates aspects of the present invention. The lottery ticket 10 may be provided to lottery players on any manner of substrate 12. For example, the lottery ticket 10 may be printed at a lottery terminal printer onto stock paper, or the pre-printed and provided to lottery retailers in the form of individual tickets. The present invention is not limited by the manner in which the tickets 10 are provided to lottery players.

The lottery tickets 10 include any manner of graphics, printing, or other indicia that advertises the game, provides instructions, displays a theme of the particular game, and so forth. In the embodiment of FIG. 1, the game of ticket 10 relates to a word puzzle theme, as will be described in greater detail below. It should be readily appreciated that the lottery tickets 10 may be conformed to any desired game, game structure, or game theme in accordance with aspects of the invention.

Each lottery ticket distributed to players in the particular game includes a grid 14. The grid 14 may be represented in any conventional manner, and need not be in a rectangular or square configuration as illustrated in the figures. For example, the grid 14 may comprise a circular configuration, serial configuration, pie sector configuration, and so forth. The term "grid" is used herein to refer to a compilation of individual positions 16 in any identifiable manner or pattern. The grid 14 includes a plurality of grid positions 16, with each grid position 16 having an indicia 18 therein including a unique identifier 22. In the illustrated embodiment, each grid position 16 includes a number as the unique grid identifier 22. In an alternate embodiment, the grid 14 may be illustrated with a coordinate system wherein columns and rows are separately labeled and each position in the grid may be identified by a set of the coordinates. Any manner of displaying the plurality of grid positions and identifying each of the grid positions is within the scope and spirit of the invention.

The particular game utilizes a field of indicia, which may be any defined set of indicia. For example, in the illustrated embodiment, the field of indicia is the complete set of letters in the alphabet A-Z. In an alternate embodiment, the field of indicia may be the numbers within a defined range, for example the numbers from 1 to 50. In still another embodiment, the field of indicia may be a defined set of symbols or pictures. For example, the field of indicia may be all of the names or mascots for the NFL (National Football League) football teams or the NHL (National Hockey League) hockey teams, and so forth. The invention is not limited by the particular defined field of indicia.

The grid 14 of each lottery ticket 10 is randomly populated with the indicia 18 from the complete field of indicia such that each indicia 18 is located in a respective grid position 16 and the entire set of indicia 18 is randomly populated into the grid. Referring to FIG. 1, all twenty-six letters of the alphabet are randomly populated into the grid 14 such that each grid position 16 contains a letter. It should thus be appreciated that, although each ticket in the game will include a grid 14 containing the entire field of indicia, the individual tickets are different from each other in the manner in which the field of indicia is randomly populated into the grid 14. For example, referring to the tickets in FIGS. 1 and 2, each grid 14 contains the complete alphabet, but the individual letters are located in different grid positions 16 within the respective grids 14.

Figure 2:
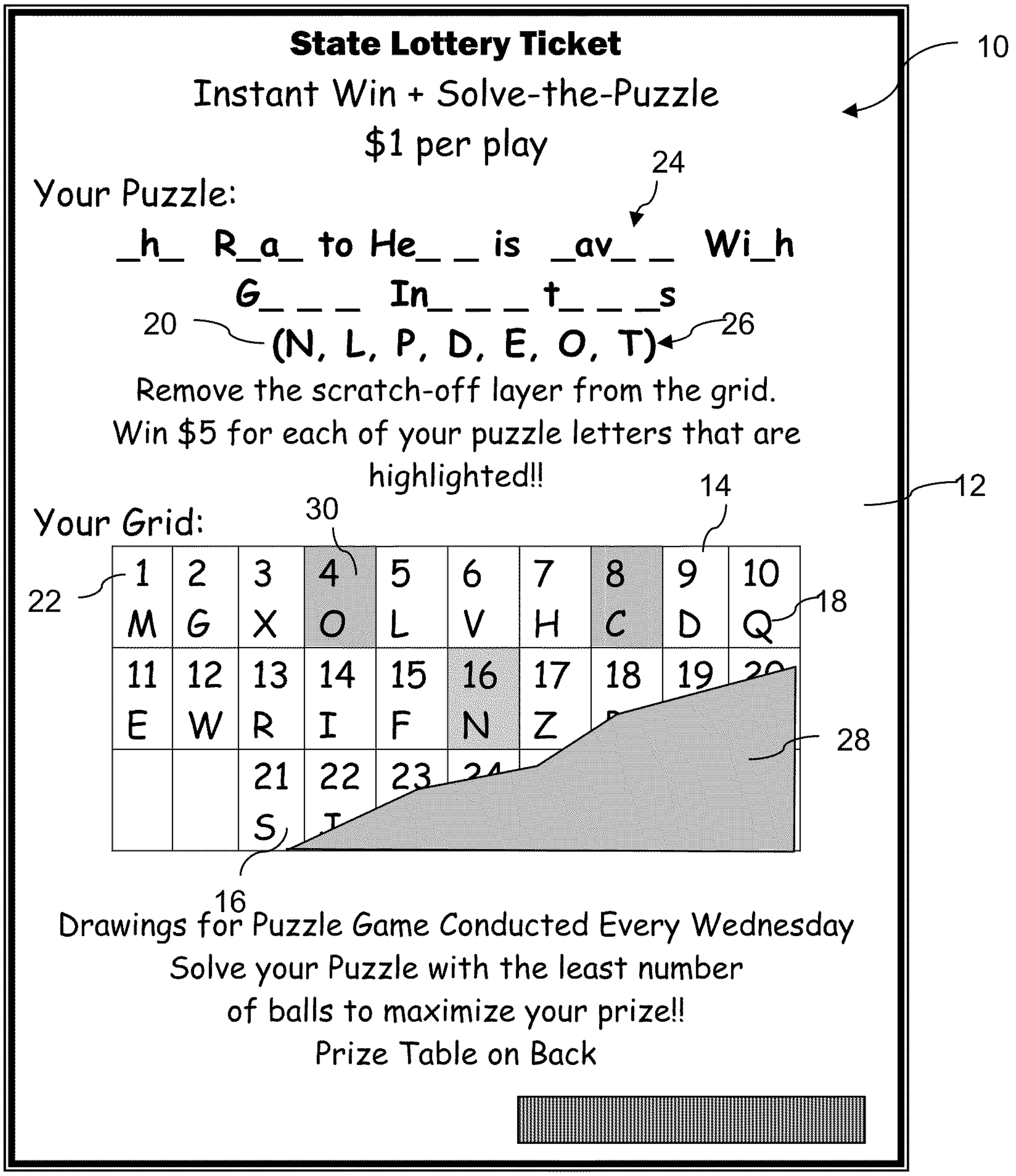
FIG. 2 is a front planar view of an alternative game ticket embodiment that includes an instant-win component.

The grids 14 may also include grid positions 16 that do not contain an indicia 18 (such as the boxes in the last rows in FIGS. 1 and 2). These positions may play no part in the game, or may be provided with their own identifier 22 and be entered into the random draw event. If selected, these blank grid positions are a "wasted" selection for the player. In an alternative embodiment, these extra grid positions may contain any manner of possible bonus symbol (e.g., prize doublers, instant cash prizes, and the like).

Each ticket 10 also includes a set of player indicia 20 that is a subset of the field of indicia contained within the grid 14. This subset 20 is randomly generated from the complete field of indicia and has a defined number of indicia that is less than the complete field of indicia. Referring to FIG. 1, for example, the player indicia 20 is the set of seven letters T, F, E, V, N, H, and U randomly generated from the letters A-Z of the alphabet.

In the illustrated embodiments, the set of player indicia 20 is randomly generated and provided to the player. It should be appreciated, however, that an alternate embodiment within the scope of the invention allows the player to select their set of player indicia 20 from the field of indicia. For example, the player may be presented with a play slip (e.g., paper or electronic) wherein the player marks seven letters of the alphabet as their set of player indicia 20. The play slip is presented to a retailer and scanned or otherwise entered into a game terminal that prints the ticket 10 with the player selected set of indicia 20.

The lottery game is continued with a subsequent drawing event wherein all of the positions 16 in the grid (positions containing at least one indicia) are randomly and sequentially drawn. This drawing event may be a scheduled event that is conducted by the lottery authority. For example, one such event may include the random drawing of balls from a machine, wherein each ball includes one of the grid position indicators 22. In the example of FIG. 1, the ball machine would include at least twenty-six balls, with the balls labeled 1 through 26. The balls are randomly and sequentially drawn until all of the balls have been selected (or less if the prize structure is limited to less than all grid positions 16 containing an indicia 18). In other words, the twenty-six balls are individually drawn one at a time and the order in which the balls are drawn is recorded. FIG. 4 illustrates the recordation of the drawing event. Referring to FIG. 4, the first ball drawn is grid position 4. The second ball drawn is grid position 1, and so forth. The last ball drawn is grid position 2. It should be appreciated that any conventional and known random generation machine, program, and the like may be utilized by the lottery authority to sequentially and randomly draw the grid positions or simulate drawing the grid positions. The drawing event may be televised or otherwise publicly displayed, or may be conducted by the lottery authority in a non-public manner with the results subsequently provided to the players in the way of a table, publication, web posting, and so forth.

Winning tickets and prizes are determined as a function of the number of the sequentially and randomly drawn grid positions that are needed to match all of the player indicia for a respective lottery ticket 10. For example, referring to FIG. 3, a prize/odds table 32 may be provided on the back of the lottery ticket 10 for the player's reference. In the alphabet indicia example of FIG. 1, the seven letters in the set of player indicia are all contained within the grid 14, and all of the grid positions were sequentially and randomly drawn. In a best possible scenario, the seven letters in the set of player indicia will correspond to the first seven grid positions drawn, which results in a maximum prize as indicated in FIG. 3. As the number of grid positions increase before all seven letters are satisfied, the prizes decrease in value. For example, referring to FIG. 3, if it is necessary to draw ten grid positions before the seven letters are found in the grid, then the prize is significantly less than the top prize. The seven letters may be found in the first fifteen grid positions drawn, resulting in an even lesser prize (if any), and so forth. The lottery may define a floor or minimum prize level below which no prize is awarded. For example, referring to FIG. 3, if the seven letters in the player's set of indicia are not located within the grid within the first twenty balls selected, then no prize is awarded for that particular lottery ticket. The draw event may cease after the first twenty balls are drawn, as discussed above.

In a particularly unique embodiment illustrated in FIGS. 1 and 2, each lottery ticket 10 includes a puzzle, problem, or other type of game 24 that relates to a theme for the lottery ticket. In the embodiment of FIGS. 1 and 2, the theme is "Solve-the-Puzzle" and a word puzzle 24 is provided on each ticket. The word puzzle 24 includes a well-known or easily recognized phrase with certain letters from the phrase missing. The solution 26 (the missing letters) corresponds to the player's set of indicia 20. The solution 26 may be provided on the ticket for the player so that little thought is required by the player to identify their set of player indicia 20. In an alternative embodiment, the solution 26 may be hidden (for example under a scratch-off layer) or provided on the back of the ticket. With this embodiment, the player is afforded the opportunity to actually complete the puzzle in order to identify their set of player indicia 20, which adds an additional entertainment value to the ticket 10. It should be appreciated that the puzzle or problem 24 may comprise any type of conventional puzzle such as a crossword puzzle, a number problem such as a Sudoku puzzle, and so forth.

The same puzzle or problem 24 may be presented on multiple tickets within the same game and solved by the same set of player indicia. This particular embodiment is still within the scope and spirit of the invention in that each lottery ticket still provides a different winning scenario because the game is determined by the position of the indicia within the randomly populated grids, which differs from ticket to ticket. It should also be understood that the players may have different puzzles to solve so long as those puzzles have the same number of unique missing letters. In this manner, the lottery is drawing a common number of indicia (grid numbers) and the matrix (number of missing letters) is standardized for all players.

It is also within the scope and spirit of the invention for the lottery game to include a "wild" or "free" grid position in the random and sequential drawing of the grid positions. For example, referring to FIG. 5, the table 34 depicts the results of a drawing wherein the 6th and 17th ball drawn were "wild balls". These wild positions allow the player to substitute any grid position they may need at that point in the game, even if that grid position is subsequently drawn. For example, the player may need one particular letter or other indicia to complete the match for all of their player indicia. If the wild grid position is drawn, the player may immediately apply such position to the location of the missing indicia in their grid.

Lottery tickets 10 may incorporate or become combined with a different type of lottery game on the same ticket. For example, referring to the embodiment of FIG. 2, the lottery ticket 10 includes an instant win component wherein, in addition to the "Solve-the-Puzzle" game discussed above, the player has the opportunity to win an instant prize based on the indicia printed on the ticket. In this particular embodiment, the instant win game is played by the player removing the scratch-off layer 28 from the grid 14. Certain of the grid positions 16 within the grid 14 are highlighted, for example grid positions 4, 8, and 16. If any of the letters in the player's set of indicia 20 are located within the highlighted grids, then the player wins a cash prize for each such occurrence. For example, in the embodiment of FIG. 2, the first letter "N" in the set of player's indicia 20 is located in the highlighted grid position 16, which entitles the player to a $5 instant cash prize. The game in FIG. 2 is otherwise played as discussed above with respect to the lottery ticket 10 in FIG. 1.

Figure 6:
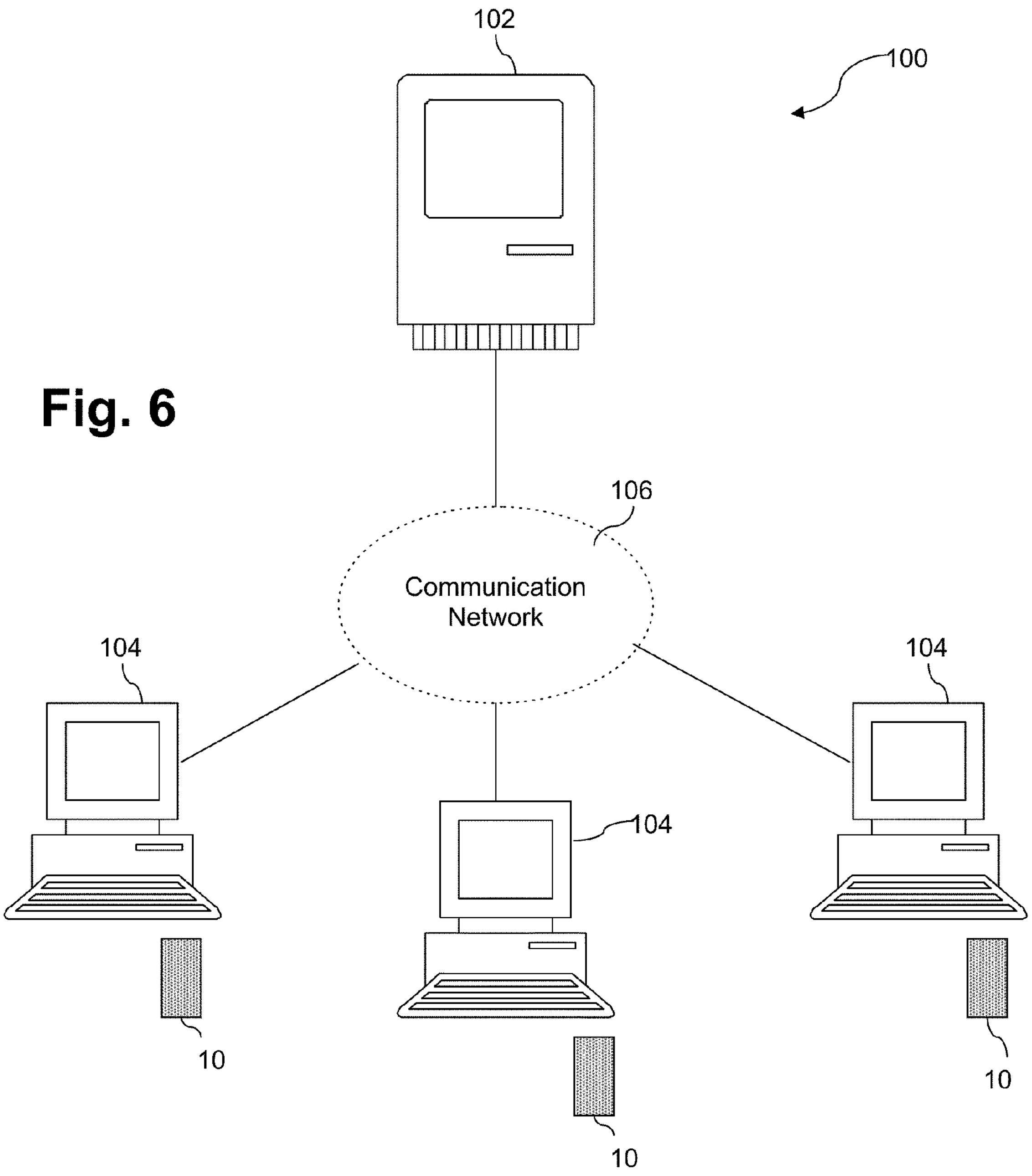
FIG. 6 is an exemplary system configuration that may be used to host a lottery game in accordance with aspects of the invention.
Figure 7:
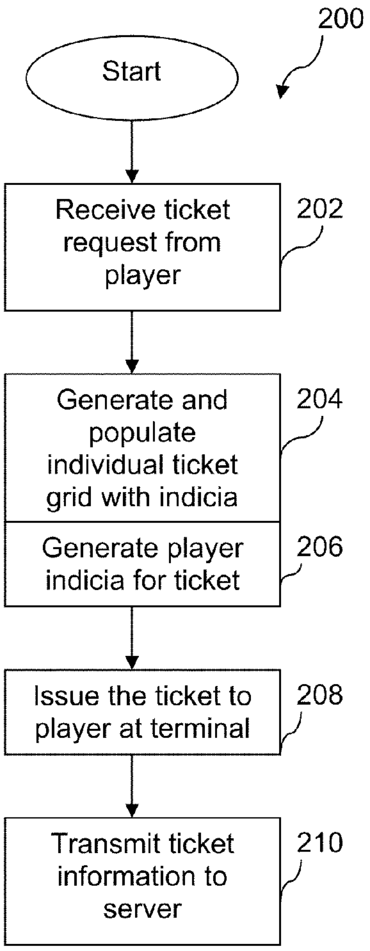
FIG. 7 illustrates an exemplary game terminal process.
Figure 8:
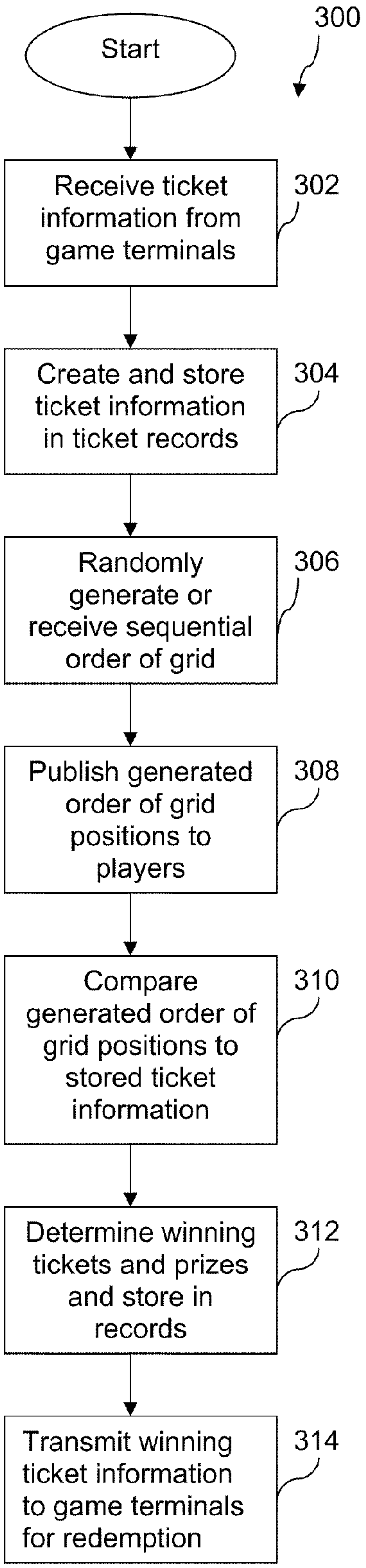
FIG. 8 illustrates an exemplary lottery server process.

Referring to FIGS. 6 through 8, the present invention also encompasses a system 100 that is uniquely configured to host the lottery game described herein. In a simplified version, the system 100 may incorporate a single stand alone gaming device having a controller configured to carry out all of the steps discussed herein necessary for hosting the game. In the embodiment illustrated in FIG. 6, the system 100 is configured for wide-area implementation of the game by a lottery authority, for example a state-wide lottery game, multi-state lottery game, and so forth. In this configuration, the system 100 includes a central lottery authority server 102 that is in communication with a plurality of game terminals 104. The game terminals 104 are located at various retail establishments where the lottery tickets are offered for sale to the public. The game terminals 104 are in communication with the server 102 through any conventional communication network 106, such as a wide-area network, Internet, or any other suitable communication network.

Referring to FIGS. 6 and 7, players wishing to play the lottery game make a ticket request 202 at any one of the game terminals 104. This request may be input directly by the player via a player input device configured with the game terminal 104, or the player request may be input by a clerk or other retail establishment person responsible for operating the respective game terminal 104. The present system and method also contemplate a voucher-based system wherein players purchase a voucher at a retail establishment or over the internet/mobile device that entitles the player to subsequent interactive play of one or more of the lottery games. Alternatively, the players may direct-pay for the games at the time of interactive play via a pre-arranged payment account, profile, or the like. At the time of interactive play, the players choose their desired games, drawings and/or indicia interactively over the internet or a mobile device for play of the games at their leisure.

The game terminals 104 include unique software and hardware configurations necessary to generate and populate individual ticket grids with the complete field of indicia at step 204. At step 206, the game terminals 104 are uniquely configured to randomly generate the set of player indicia or to accept a player's selection of player indicia via a play slip or other entry means. For example, the game terminals 104 may be equipped with a scanner that reads the player's selection of indicia from a play slip that is filled out by the players. Alternatively, the game terminals 104 may include a keyboard or other entry means by which the player's selection of indicia is entered.

In an alternative embodiment, the randomly populated grids may be algorithmically "predefined" and stored on a game server 102 that is in communication with the individual game terminals 104. Upon purchase, these predefined tickets are distributed to players either randomly or in sequential order. In this sense, "predefined" does not mean that the outcome of the game for any respective ticket is predetermined (a win or loss is determined by the subsequent draw process), but only that the randomized grids are defined and stored before purchase.

At step 208, the game terminals 104 issue the lottery ticket 10 to the player. The ticket 10 includes the randomly populated grid as well as the player's set of indicia, as discussed above. The ticket 10 may also include any other manner of graphics, indicia, or other information related to the particular lottery game.

At step 210, the game terminals 104 transmit information related to the issued ticket to the lottery server 102. This information may include, among other things, a unique serial number or other identification related to each individual ticket, the unique randomized grid associated with the ticket, the player's set of indicia, and so forth.

Referring to FIG. 8, aspects of the server process 300 are illustrated. At step 302, the server 102 receives the ticket information from the various game terminals 104. At step 304, the server 102 creates a record for each ticket and stores the ticket information related to each issued ticket. At step 306, the server 102 may randomly generate the sequential order of grid positions for further play of the game. In an alternative embodiment, the random generation of the sequential order of grid positions may be conducted at a drawing event, as discussed above, with the results of the drawing being communicated to the server 102.

At step 308, the result of the drawing or random generation of grid positions is published to the players by any suitable means.

At step 310, the server compares the generated order of grid positions to the stored ticket information and determines individual winning tickets and respective prizes at step 312.

When winning tickets are presented by players for redemption at the game terminals 104 (or other redemption location), the server 102 retrieves the winning ticket and prize information for the respective ticket and transmits the information to the game terminal 104 or other redemption location.

It should be readily appreciated that the system configuration set forth in FIGS. 6 through 8 is an illustration of but one type of system that may be utilized. Any number of modifications to system hardware and software may be made to implement and host the lottery game, and all such modifications and variations are within the scope and spirit of the present invention.

It should be readily appreciated by those skilled in the art that various modifications and variations can be made to the embodiments illustrated and described herein without departing from the scope and spirit of the invention.

What is claimed is:

1. A lottery game method implemented by one or more game terminals in communication with a server via a communications network, comprising:

by the game terminal, providing a plurality of lottery tickets to players in the lottery game, each lottery ticket having a grid of positions, each grid position having a unique identifier assigned thereto on the ticket;

randomly populating the grid on each ticket with indicia from a field of indicia such that each grid position contains at least one indicia and all indicia in the field of indicia are randomly populated into the grid, with each indicia in the field of indicia used on the ticket only once, the randomly populated grid varying between different lottery tickets;

the indicia populated into each grid position being in addition to the unique identifier assigned to each grid position;

indicating a set of player indicia on each lottery ticket, the set of player indicia comprising a randomly generated or player-selected subset of the field of indicia;

by the server, randomly and sequentially drawing the unique identifiers on the grid subsequent to issuance of the plurality of lottery tickets to the players, and providing to the players a sequential order in which the unique identifiers were drawn via a post-drawing means separate from the lottery tickets; and wherein prizes are determined for winning lottery tickets as a function of the number of grid positions sequentially and randomly drawn needed to match the set of player indicia on the respective lottery tickets.

2. The method as in claim 1, wherein the grid positions are numbered on the lottery tickets, and the numbers are randomly and sequentially drawn and presented to the players in the order drawn.

3. The method as in claim 1, wherein each of the lottery tickets further comprises a puzzle that is solved by the set of player indicia.

4. The method as in claim 3, wherein at least a portion of the plurality of the lottery tickets have a same puzzle solved by the same set of player indicia, with the set of player indicia being randomly populated into different grid positions between the respective lottery tickets.

5. The method as in claim 4, wherein a solution to the puzzle is provided on the lottery tickets.

6. The method as in claim 1, wherein the field of indicia comprises letters of an alphabet, and the set of player indicia comprises letters needed to solve a word puzzle.

7. The method as in claim 6, wherein a plurality of the lottery tickets have a same word puzzle solved by a same set of player indicia, with the set of player indicia being randomly populated into different grid positions between the respective lottery tickets.

8. The method as in claim 1, wherein at least one of the randomly generated grid positions is a wild position that may be used by a player to select any position on their respective lottery ticket grid.

9. The method as in claim 1, wherein the lottery tickets have an instant win component that is determined upon removing a scratch-off material from at least one of the grid or player indicia on the ticket.

10. The method as in claim 9, wherein the instant win component includes matching one of the player indicia with a particular grid position designated on the lottery ticket for an instant-prize win.

11. The method as in claim 1, wherein the grids contain only as many grid positions as there are indicia in the field of indicia such that each grid position contains one indicia from the field of indicia and all of the grid positions are randomly and sequentially drawn.

12. A system for hosting a lottery game, comprising:

a communication network;

a plurality of game terminals;

a server in communication with said game terminals via said communication network;

a plurality of lottery tickets;

said game terminals configured to issue said lottery tickets to players, with each lottery ticket having a grid of positions, each grid position having a unique identifier assigned thereto on the ticket;

said game terminals configured to randomly populate the grid on each ticket with indicia from a field of indicia such that each grid position contains at least one indicia and all indicia in the field of indicia are randomly populated into the grid, with each indicia in the field of indicia used on the ticket only once, the randomly populated grid varying between different lottery tickets;

the indicia populated into each grid position being in addition to the unique identifier assigned to each grid position;

said game terminals further configured to indicate a set of player indicia on each lottery ticket, the set of player indicia comprising a randomly generated or player-selected subset of the field of indicia;

said game terminals further configured to transmit information on each ticket issued to said server, said server storing a record of each ticket issued that includes the transmitted information;

wherein in a subsequent drawing event, the unique identifiers on the grid are randomly and sequentially drawn and presented to the players via a post-drawing means separate from the lottery tickets in a sequential order in which they were drawn; and said server further configured to determine winning tickets from the stored records and determine prizes for winning lottery tickets as a function of the number of grid positions sequentially and randomly drawn needed to match the set of player indicia on the respective lottery tickets.

13. The system as in claim 12, wherein said game terminals are configured to number the grid positions on said lottery tickets, with the numbers being randomly and sequentially drawn and presented to the players in the order drawn in the subsequent drawing event.

14. The system as in claim 12, wherein said lottery tickets further comprise a puzzle that is solved by the set of player indicia.

15. The system as in claim 14, wherein a solution to the puzzle is provided on said lottery tickets.

16. The system as in claim 12, wherein the field of indicia comprises letters of an alphabet, and the set of player indicia comprises letters needed to solve a word puzzle.

17. The system as in claim 16, wherein said game terminals are further configured to generate at least a portion of the plurality of said lottery tickets having a same word puzzle solved by a same set of player indicia, with the set of player indicia being randomly populated into different grid positions between the respective lottery tickets.

18. The system as in claim 12, wherein said at least one of the grid positions is designated as a wild position that may be used by a player to select any position on their respective lottery ticket grid.

19. The system as in claim 12, wherein the grids contain only as many grid positions as there are indicia in the field of indicia such that each grid position contains one indicia from the field of indicia and all of the grid positions are randomly and sequentially drawn.

20. The system as in claim 12, wherein said lottery tickets include an instant-win component and comprise a scratch-off material over at least one of the grid or player indicia on the ticket.

* * * * *